United States Patent
Chen

(10) Patent No.: US 10,080,251 B2
(45) Date of Patent: Sep. 18, 2018

(54) WIRELESS COMMUNICATION SYSTEM

(71) Applicant: FUJITSU LIMITED, Kawasaki-shi, Kanagawa (JP)

(72) Inventor: Hongyang Chen, Kawasaki (JP)

(73) Assignee: FUJITSU LIMITED, Kawasaki-shi (JP)

( * ) Notice: Subject to any disclaimer, the term of this patent is extended or adjusted under 35 U.S.C. 154(b) by 0 days.

(21) Appl. No.: 15/385,363

(22) Filed: Dec. 20, 2016

(65) Prior Publication Data

US 2017/0105240 A1    Apr. 13, 2017

Related U.S. Application Data

(63) Continuation of application No. PCT/JP2014/067376, filed on Jun. 30, 2014.

(51) Int. Cl.
*H04W 4/00* (2018.01)
*H04W 76/14* (2018.01)
(Continued)

(52) U.S. Cl.
CPC .......... *H04W 76/14* (2018.02); *H04W 8/005* (2013.01); *H04W 72/0446* (2013.01);
(Continued)

(58) Field of Classification Search
CPC ............ H04W 76/023; H04W 72/082; H04W 72/0446; H04W 8/005; H04W 92/18; H04W 88/02; H04W 88/08
See application file for complete search history.

(56) References Cited

U.S. PATENT DOCUMENTS

2011/0282989 A1* 11/2011 Geirhofer ............. H04L 67/104
709/224
2013/0148566 A1    6/2013 Doppler et al.
(Continued)

FOREIGN PATENT DOCUMENTS

JP    2013-529032 A    7/2013
JP    2014-103693 A    6/2014
(Continued)

OTHER PUBLICATIONS

Overview of 3GPP Release 12 V0.1.2 (Mar. 2014), 21.8 Study on LTE Device to Device Proximity Services, Mar. 2014.
(Continued)

*Primary Examiner* — Clemence S Han
(74) *Attorney, Agent, or Firm* — Myers Wolin, LLC.

(57) ABSTRACT

A wireless communication system includes: a plurality of terminal devices respectively configured to support D2D (Device to Device) communication; and a base station configured to control the plurality of terminal devices. A first terminal device that communicates with a second terminal device via a first D2D link receives identification information of a third terminal device from the third terminal device that communicates with a fourth terminal device via a second D2D link. The first terminal device transmits the identification information of the third terminal device received from the third terminal device to the base station. The base station controls at least one of a resource for the first D2D link and a resource for the second D2D link in such a way that the resource for the first D2D link and the resource for the second D2D link are different from each other.

15 Claims, 12 Drawing Sheets

(51) Int. Cl.
*H04W 76/02* (2009.01)
*H04W 72/04* (2009.01)
*H04W 8/00* (2009.01)
*H04W 72/08* (2009.01)
*H04W 88/08* (2009.01)
*H04W 88/02* (2009.01)
*H04W 92/18* (2009.01)

(52) U.S. Cl.
CPC ....... *H04W 72/082* (2013.01); *H04W 76/023* (2013.01); *H04W 88/02* (2013.01); *H04W 88/08* (2013.01); *H04W 92/18* (2013.01)

(56) References Cited

U.S. PATENT DOCUMENTS

| | | | |
|---|---|---|---|
| 2014/0185529 | A1 | 7/2014 | Lim et al. |
| 2014/0314039 | A1 | 10/2014 | Jang et al. |
| 2015/0172037 | A1 | 6/2015 | Morita |
| 2015/0257153 | A1 | 9/2015 | Yamazaki |
| 2017/0026939 | A1* | 1/2017 | Fodor ................... H04L 5/0073 |
| 2017/0105102 | A1* | 4/2017 | Smadi et al. ........... H04W 4/08 |

FOREIGN PATENT DOCUMENTS

| | | | |
|---|---|---|---|
| WO | 2011/143496 | A1 | 11/2011 |
| WO | 2012/015698 | A1 | 2/2012 |
| WO | 2013/032251 | A2 | 3/2013 |
| WO | 2013/073915 | A1 | 5/2013 |
| WO | 2013/170908 | A1 | 11/2013 |
| WO | 2014/034572 | A1 | 3/2014 |
| WO | 2014050557 | A1 | 4/2014 |

OTHER PUBLICATIONS

Intel Corporation, "Resource allocation signaling for D2D communication", 3GPP TSG-RAN WG2#85bis, Valencia, Spain, R2-141223Mar. 31-Apr. 4, 2014. Cited in ISR for PCT/JP2014/067376.

Samsung, "Mode 2 resource allocation for D2D broadcast communication", 3GPP TSG-RAN WG1#76b R1-141306, Shenzen, China, Mar. 31-Apr. 4, 2014. Cited in ISR for PCT/JP2014/067376.

Resource coordination for partial coverage, 3GPP TSG-RAN WG2#85 R2-140787, Prague, Czech Republic, Feb. 10-14, 2014. Cited in ISR for PCT/JP2014/067376.

International Search Report issued for corresponding International Patent Application No. PCT/JP2014/067376 dated Sep. 9, 2014.

Written Opinion issued for International Patent Application No. PCT/JP2014/067376 dated Sep. 9, 2014 with English translation attached.

Extended European search report with supplementary European search report and the European search opinion issued by the European Patent Office for corresponding European Patent Application No. 14896309.3, dated Jun. 9, 2017.

Notification of Reasons for Refusal issued by the Japan Patent Office for corresponding Japanese Patent Application No. 2016-530695, dated Sep. 12, 2017, with an English translation.

Catt, "CSMA or Coordinated Access based Resource Allocation for D2D Communication", Agenda Item: 7.5.11, 3GPP TSG-RAN WG2 Meeting #84, R2-134061, San Francisco, USA, Nov. 11-15, 2011.

Nokia et al., "D2D Discovery", Agenda Item: 6.2.7.3, 3GPP TSG-RAN WG1 Meeting #73, R1-132317, Fukuoka, Japan, May 20-24, 2013.

Alcatel-Lucent Shanghai Bell et al., "Consideration of Interference Mitigation for D2D Communication", Agenda Item: 7.2.8, 3GPP TSG-RAN WG1 Meeting #74, R1-132993, Barcelona, Spain, Aug. 19-23, 2013.

Communication pursuant to Article 94(3) EPC issued by the European Patent Office for corresponding European Patent Application No. 14 896 309.3-1215, dated Jun. 4, 2018.

Notice of Preliminary Rejection issued by the Korean Intellectual Property Office for corresponding Korean Patent Application No. 10-2016-7036116, dated Jul. 18, 2018, with English translation.

* cited by examiner

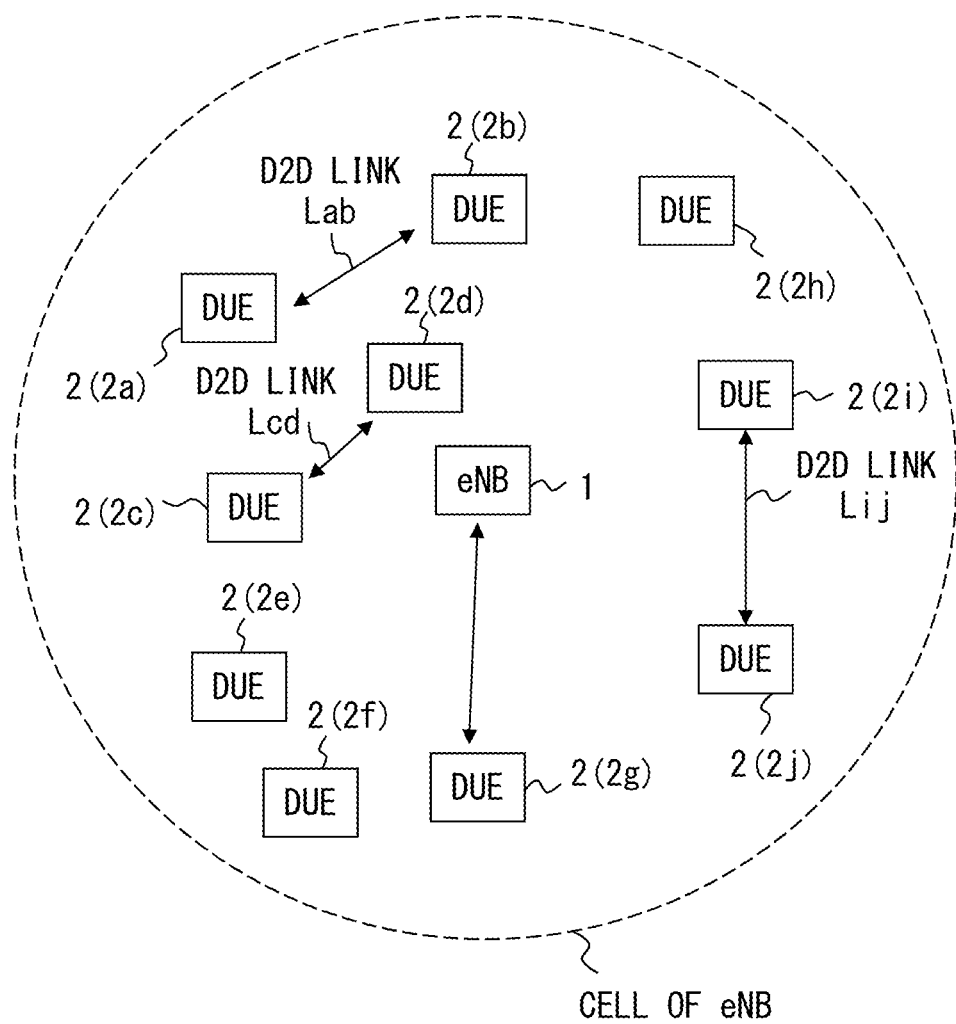
F I G. 1

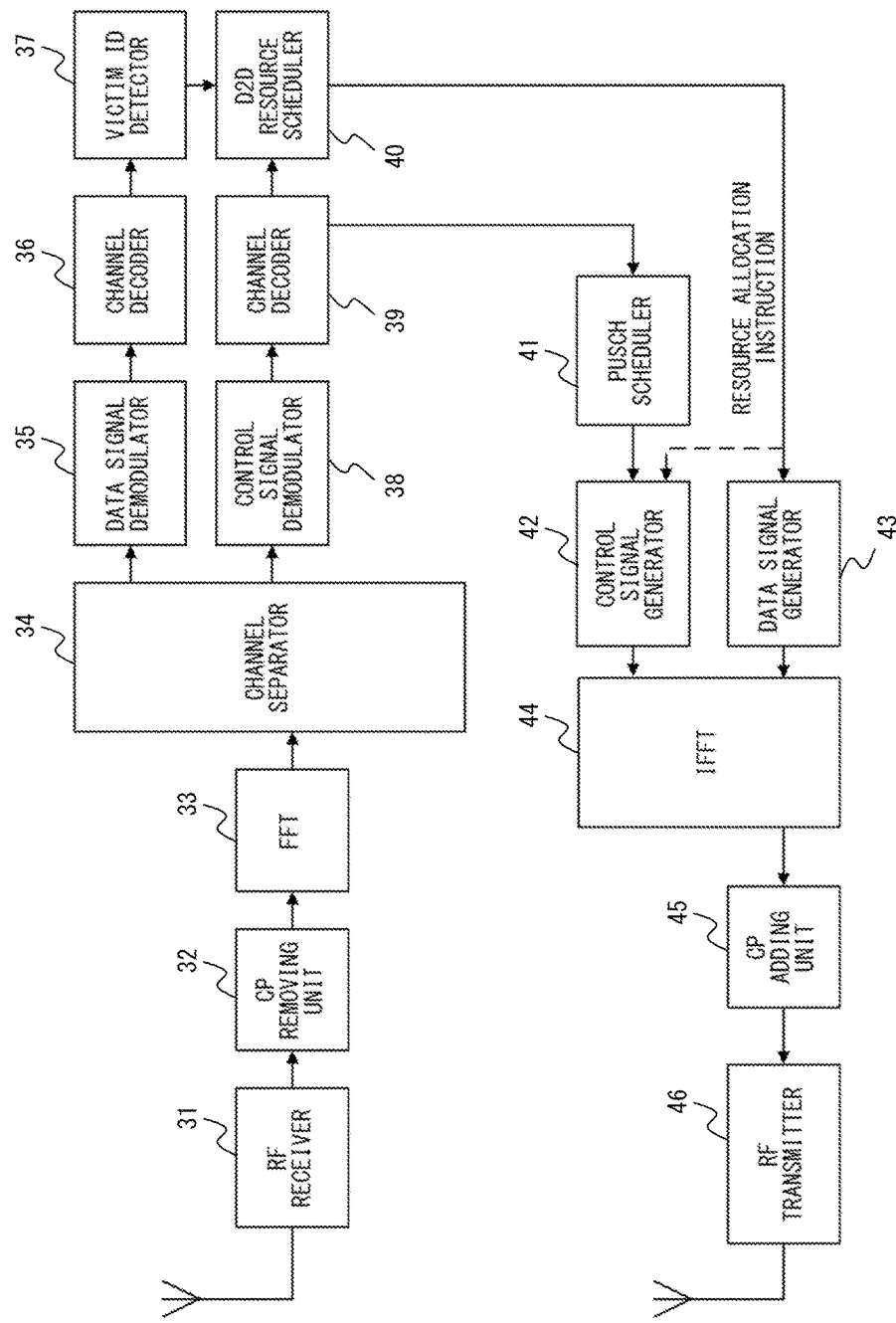
F I G. 7

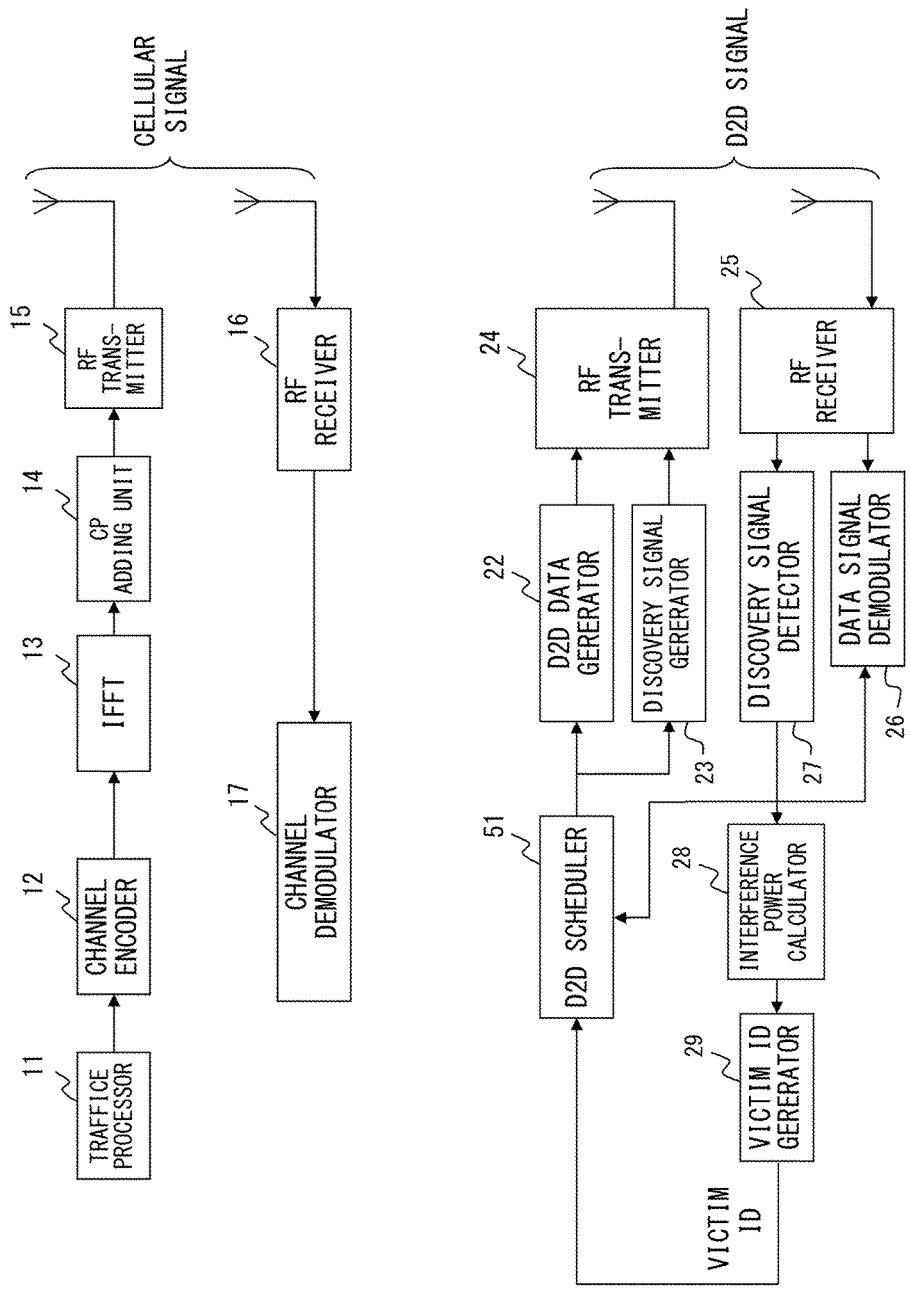
F I G. 9

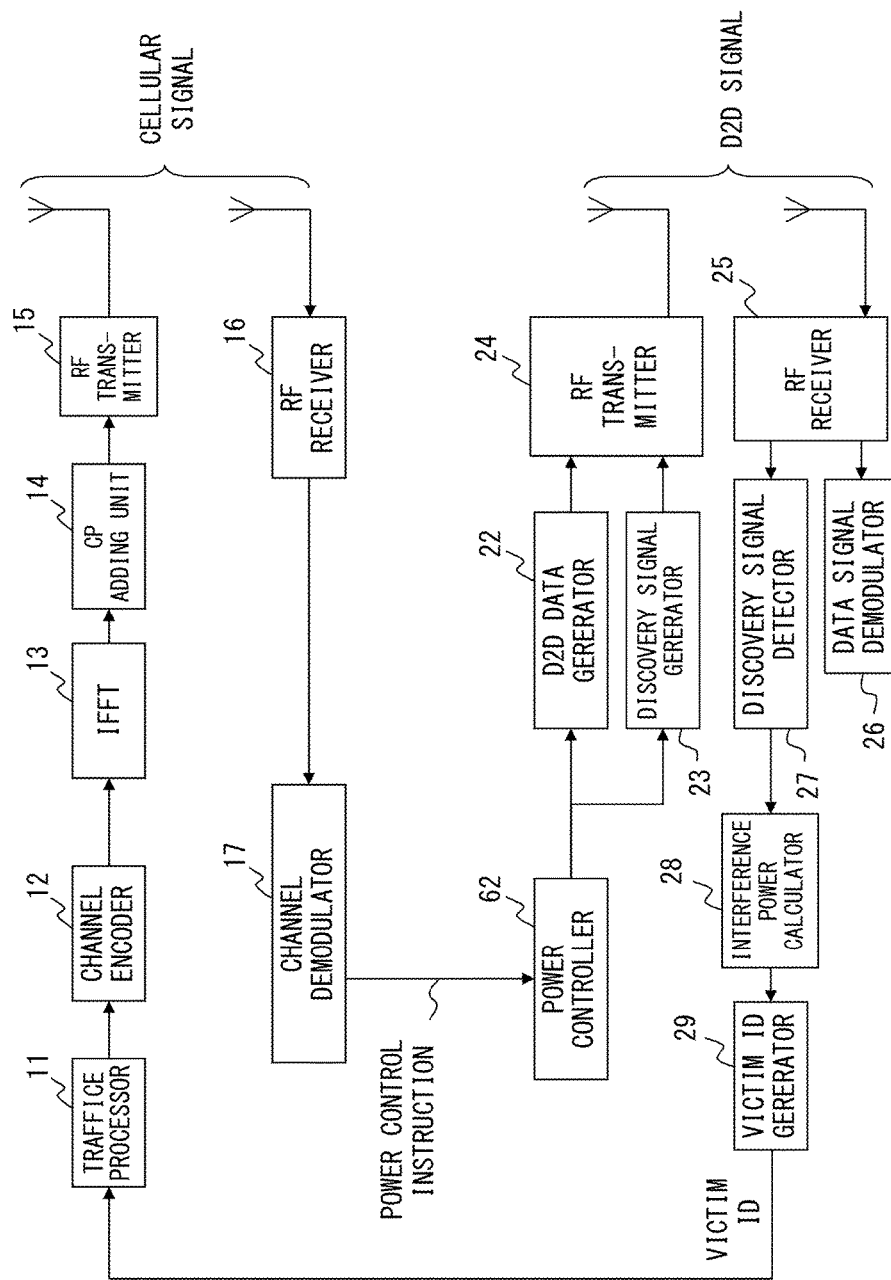
F I G. 12

WIRELESS COMMUNICATION SYSTEM

CROSS-REFERENCE TO RELATED APPLICATION

This application is a continuation application of International Application PCT/JP2014/067376 filed on Jun. 30, 2014 and designated the U.S., the entire contents of which are incorporated herein by reference.

FIELD

The embodiments discussed herein are related to a wireless communication system that supports D2D (Device to Device) communication, and a base station and a terminal device used in the wireless communication system.

BACKGROUND

The 3GPP (Third Generation Partnership Project) discusses a standardization of mobile communication schemes. For example, high-speed wireless communication schemes such as LTE (Long Term Evolution) are standardized in 3GPP. In 3GPP release 12, D2D communication is discussed as a new wireless communication scheme. Note that D2D communication is an LTE extended specification and may be referred to as LTE Device-to-Device Proximity Services.

In D2D communication, a terminal device can directly communicate with another terminal device without transferring data via a base station. Thus, D2D communication is expected to provide communications with small delays. In addition, since D2D communication can be performed even in an area where a radio wave from a base station cannot reach (or an area where a base station does not exist), D2D communication may be useful for extending cell coverage. Furthermore, since D2D communication can be performed even when a base station is not working (for example, after an earthquake), D2D communication may be useful for improving user security. Note that a communication link established between terminal devices for D2D communication may be referred to as a D2D link.

D2D communication may be implemented by using a cellular communication system. That is, D2D communication may use resources of the cellular communication system. When a plurality of D2D links are established, the same resource (for example, radio frequency) may be allocated to the plurality of D2D links when there are a large number of D2D links. Accordingly, spectrum efficiency is high and precious resources are efficiently allocated to users in D2D communication.

As described above, the same resource may be allocated to a plurality of D2D links in D2D communication. Thus, when the same resource is allocated to D2D links that are close to each other, interference may occur between the D2D links.

However, since D2D communication is a new scheme, the interference between the D2D links has not been sufficiently considered in 3GPP. That is, a method for suppressing the interference between the D2D links has not been determined. Note that this problem may arise not only in D2D communication described in 3GPP release 12, but also in any wireless communication system that supports direct communication between terminal devices.

SUMMARY

According to an aspect of the present invention, a wireless communication system includes: a plurality of terminal devices respectively configured to support D2D (Device to Device) communication; and a base station configured to control the plurality of terminal devices. A first terminal device that communicates with a second terminal device via a first D2D link receives identification information of a third terminal device from the third terminal device that communicates with a fourth terminal device via a second D2D link. The first terminal device transmits the identification information of the third terminal device received from the third terminal device to the base station. The base station controls at least one of a resource for the first D2D link and a resource for the second D2D link in such a way that the resource for the first D2D link and the resource for the second D2D link are different from each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of a wireless communication system according to a first embodiment of the present invention.

FIG. 7 illustrates an example of a configuration of a base station used in the first embodiment.

FIG. 9 illustrates an example of a configuration of a terminal device used in the second embodiment.

FIG. 12 illustrates an example of a configuration of a terminal device used in the third embodiment.

DESCRIPTION OF EMBODIMENTS

First Embodiment

Figure 2:
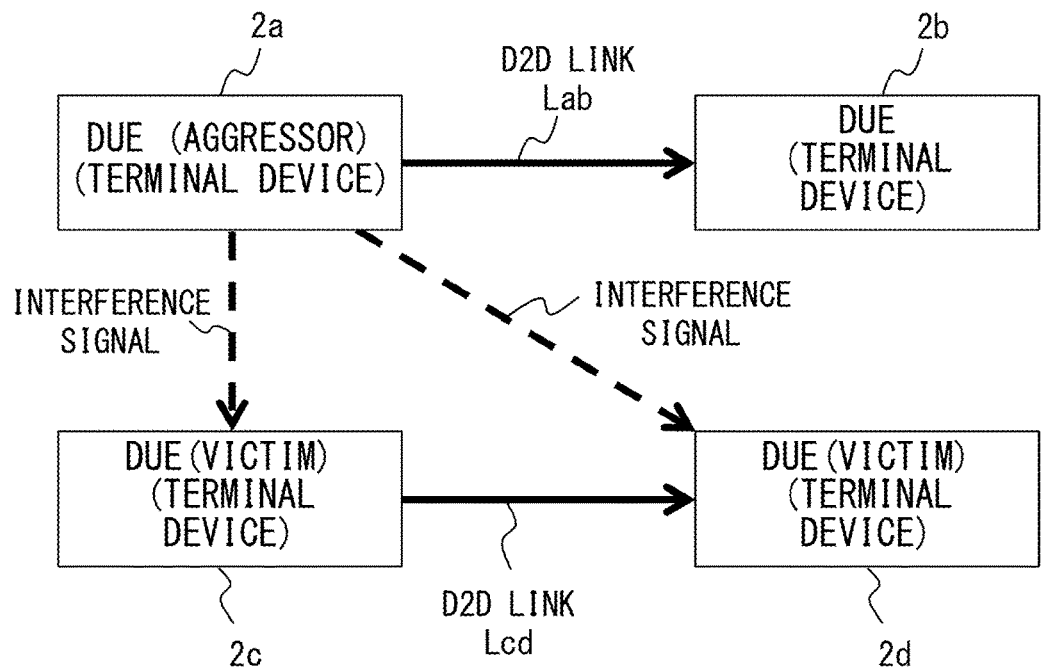
FIG. 2 illustrates a model of interference between D2D links.

FIG. 1 illustrates a configuration of a wireless communication system according to a first embodiment of the present invention. The wireless communication system according to the first embodiment includes a base station 1 and a plurality of base stations 2 (2a-2j), as illustrated in FIG. 1.

The base station 1 is an eNB (evolved Node B) in this embodiment. eNB is abase station used in LTE. Thus, the base station 1 manages and controls cellular communication of LTE. That is, the base station 1 can receive data signals and control signals of cellular communication transmitted from a terminal device and process the received signals. In addition, the base station 1 can transmit data signals and control signals of cellular communication to a terminal device.

The base station 1 manages and controls D2D communication between terminal devices. That is, the base station 1 manages D2D links established in a cell of the base station 1. For example, the base station 1 manages resources allocated to D2D links. As an example, the base station 1 can allocate respective Physical Resource Blocks (PRB) to respective D2D links. The Physical Resource Block is implemented by, for example, a radio frequency resource. In a case where D2D communication transmits signals in time division multiplexing, the base station 1 may allocate respective time slots to D2D links.

The terminal device (DUE: D2D User Equipment) 2 is configured to support cellular communication and D2D communication. That is, the terminal device 2 can transmit and receive data to/from another terminal device via the base station 1. In addition, the terminal device 2 can transmit and receive data directly to/from another terminal device via a D2D link without going via the base station 1. Note that data transmitted by cellular communication or D2D communication may include audio data, image data, video data, text data and so on.

In the example illustrated in FIG. 1, a D2D link Lab is established between the terminal device 2a and the terminal device 2b. A D2D link Lcd is established between the terminal device 2c and the terminal device 2d. A D2D link Lij is established between the terminal device 2i and the terminal device 2j. Note that the terminal device 2g communicates with another terminal device via the base station 1.

In the above-described wireless communication system, the base station 1 can allocate a resource to a D2D link in response to a request for D2D communication from the terminal device 2. For example, the base station 1 can allocate one sub-band frequency to a D2D communication between the terminal device 2a and the terminal device 2b (that is, a D2D link Lab).

The base station 1 can allocate the same resource to a plurality of D2D links. That is, the resource may be "reused" by a plurality of D2D links. Thus, the spectrum efficiency is high and precious resources are efficiently allocated to users in D2D communication.

However, when the same resource is allocated to D2D links that are close to each other, interference may occur between the D2D links. For example, since the terminal devices 2a-2d are located closely each other, a D2D link Lab and a D2D link Lcd are established closely each other. In this case, if the same resource is allocated to the D2D link Lab and the D2D link Lcd, interference may occur between those D2D links.

FIG. 2 illustrates a model of interference between D2D links. In the example illustrated in FIG. 2, the terminal device 2a transmits data to the terminal device 2b via a D2D link Lab, and the terminal device 2c transmits data to the terminal device 2d via a D2D link Lcd. The same resource (for example, the same frequency) is allocated to the D2D link Lab and the D2D link Lcd. In addition, it is assumed that a signal transmitted via the D2D link Lcd is affected or disturbed by a transmission signal of the terminal device 2a. In this case, the terminal device 2a is an "aggressor", and the terminal devices 2c and 2d are "victim(s)".

In the wireless communication system according to the first embodiment, a terminal device (or a D2D link) that can be a victim is detected. Note that a terminal device that can be a victim may be referred to as a "possible victim terminal device" in this description of the patent application. When a possible victim terminal device is detected, the base station 1 may change resource allocation for D2D communication.

As an example, a resource for a D2D link between possible victim terminal devices may be changed. In the example illustrated in FIG. 2, the resource that has been allocated to the D2D link Lcd is changed in such a way that the resource for the D2D link Lab and the resource for the D2D link Lcd are to be different from each other. Note that the base station 1 may control the resource that will be allocated to the D2D link Lab in place of changing the resource that has been allocated to the D2D link Lcd.

Figure 3A:
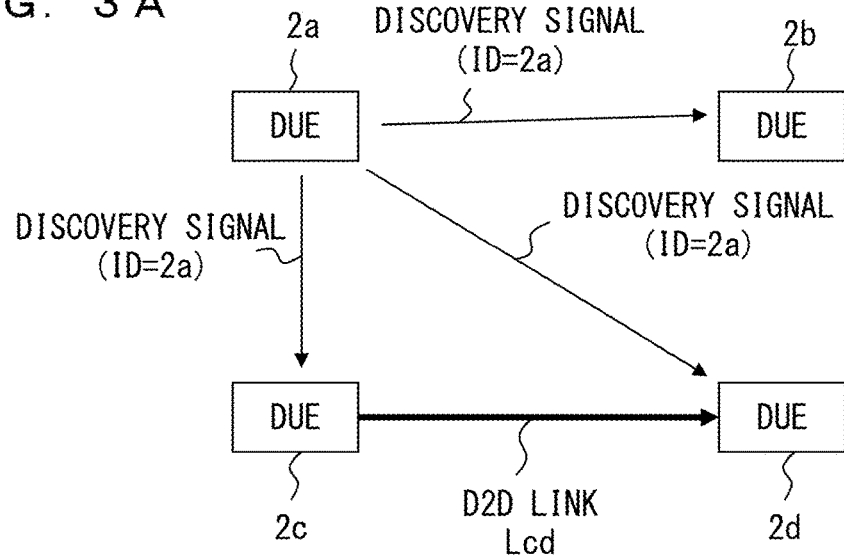
FIGS. 3A and 3B illustrate a detection of a possible victim terminal device.
Figure 3B:
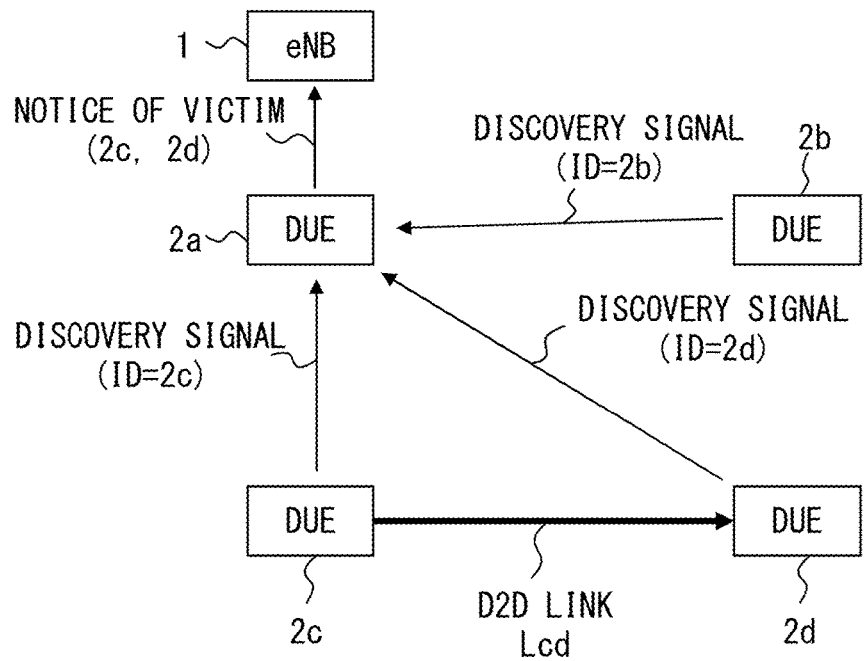

FIGS. 3A and 3B illustrate a detection of a possible victim terminal device. In this example, the D2D link Lcd has already been established between the terminal device 2c and the terminal device 2d. Then the terminal device 2a requests to start D2D communication for transmitting data to the terminal device 2b.

In this case, the terminal device 2a broadcasts a discovery signal, as illustrated in FIG. 3A. The discovery signal is used for reporting an existence of a terminal device that generates the discovery signal to other terminal devices. Thus, a discovery signal carries a message including identification information of a source terminal device of the discovery signal. For example, a discovery signal transmitted from the terminal device 2a carries "terminal ID: 2a". Note that a sequence of the discovery signal is based on, for example, a PRACH (Physical Random Access Channel), an SRS (Sounding Reference Signal), and a PSS (Primary Synchronization Signal) and/or SSS (Secondary Synchronization Signal). The message of the discovery signal is transmitted by using, for example, a PUSCH (Physical Uplink Shared Channel).

The discovery signal transmitted from the terminal device 2a is received by a terminal device located near the terminal device 2a. In this example, the terminal devices 2b-2d respectively receive a discovery signal transmitted from the terminal device 2a. As a result, the terminal devices 2b-2d respectively detect that the terminal device 2a exists.

As illustrated in FIG. 3B, each of the terminal devices 2b-2d also transmits a discovery signal to the terminal device 2a. Each of the discovery signals includes identification information of a source terminal device of the discovery signal. That is, a discovery signal transmitted from the terminal device 2b carries "terminal ID: 2b". A discovery signal transmitted from the terminal device 2c carries "terminal ID: 2c". A discovery signal transmitted from the terminal device 2d carries "terminal ID: 2d". Then the terminal device 2a receives those three discovery signals.

Note that the terminal device 2b is a destination of D2D communication for the terminal device 2a. Thus, in the following description, the terminal device 2b is not considered in a search of a possible victim terminal device.

When the terminal device 2a receives a discovery signal, the terminal device 2a may decide that a source terminal device of the discovery signal is a "possible victim terminal device". For example, when the terminal device 2a receives discovery signals respectively from the terminal devices 2c and 2d, a signal transmitted from the terminal device 2a is expected to arrive at the terminal devices 2c and 2d. That is, when the terminal device 2a starts D2D communication, a data signal transmitted from the terminal device 2a to the terminal device 2b could be an interference signal for the terminal devices 2c and 2d. Therefore, in this case, it is reasonable for the terminal device 2a to decide that the terminal devices 2c and 2d are possible victim terminal devices.

However, in the embodiment, the terminal device 2a calculates possible interference powers respectively received by the terminal devices 2c and 2d from the terminal device 2a based on received powers of the discovery signals at the terminal device 2a. Then the terminal device 2a decides whether the terminal devices 2c and 2d are possible victim terminal devices by respectively comparing the calculated interference powers with a specified threshold. In the following description, a sequence to decide whether the terminal device 2c is a possible victim terminal device will be explained.

The terminal device 2a detects a received power Pr(c) of a discovery signal transmitted from the terminal device 2c. Then the terminal device 2a calculates a path loss PL(a,c) between the terminal devices 2a and 2c based on the received power Pr(c). The path loss PL(a,c) is calculated by the formula (1).

$$PL(a,c)=Pr(c)-P0 \qquad (1)$$

P0 represents a transmission power of a discovery signal. It is assumed that the transmission power of the discovery signal is common to all terminal devices in the wireless communication system, and known to each of the terminal devices 2. Alternatively, information that represents the transmission power of the discovery signal may be reported from a source terminal device of the discovery signal (terminal device 2c in this example) to a destination terminal device of the discovery signal (terminal device 2a in this example) by using a discovery signal itself or other signals. In addition, when the base station 1 provides a transmission power indication value of the discovery signal to a terminal device, the base station 1 may report the indication value to terminal devices.

The terminal device 2a calculates a possible interference power Pi(a,c) received by the terminal device 2c from the terminal device 2a, based on the path loss PL(a,c) between the terminal devices 2a and 2c. The interference power Pi(a,c) is calculated by the formula (2).

$$Pi(a,c)=Pt(a,b)-PL(a,c) \qquad (2)$$

Pt(a,b) represents a transmission power of a data signal transmitted from the terminal device 2a to the terminal device 2b in D2D communication. Pt(a,b) may be the maximum transmission power accepted in D2D communication. When the transmission power of D2D communication is determined by TCP (Transmission Power Control), an initial value may be used as Pt(a,b) in the formula (2). When the transmission power is controlled between terminal devices before D2D communication starts, the value obtained by the power control sequence may be used as Pt(a,b) in the formula (2). In any case, the transmission power of the terminal device 2a is known to the terminal device 2a.

Note that the terminal device 2a may calculate the interference power before the terminal device 2a transmits a data signal to the terminal device 2b in D2D communication. That is, the terminal device 2a calculates an interference power that would be received by the terminal device 2c from the data signal when the terminal device 2a transmits the data signal to the terminal device 2b in D2D communication. Therefore, the interference power calculated by the terminal device 2a is a "possible interference power". Note that in the following description, "possible interference power" may be simply referred to as "interference power".

The terminal device 2a compares the interference power Pi(a,c) with a specified threshold θ. Then, if the interference power Pi(a,c) is higher than the threshold θ, the terminal device 2c is determined to be a possible victim terminal device. On the other hand, if the interference power Pi(a,c) is lower than or equal to the threshold θ, the terminal device 2c is not determined to be a possible victim terminal device.

Similarly, the terminal device 2a calculates possible interference power Pi(a,d) received by the terminal device 2d from the terminal device 2a, based on path loss PL(a,d) between the terminal devices 2a and 2d. Then the terminal device 2a decides whether the terminal device 2d is a possible victim terminal device, by comparing the interference power Pi(a,d) with the threshold θ.

The threshold of the interference power is determined by, for example, a simulation or experiment made in advance. In this case, one threshold may be determined for one D2D communication group to which a plurality of terminal devices belong. For example, the same threshold may be given to the terminal devices 2a-2j illustrated in FIG. 1. The base station 1 may inform the threshold to each of the terminal devices 2 by, for example, RRC (Radio Resource Control) signaling.

The threshold may be determined dynamically for each terminal device. In this case, the terminal device 2 measures a received signal strength of a signal (such as a discovery signal, a synchronization signal and so on) transmitted from another terminal device. The measurement result is reported to the base station 1. By so doing, the base station 1 calculates a threshold for searching a possible victim terminal device based on the measurement result. Then the base station 1 transmits the threshold to the terminal device 2 by using, for example, a PDCCH (Physical Downlink Control Channel). According to this sequence, an appropriate threshold is given to each terminal device.

The threshold may be determined based on, for example, the worst SIR (Signal-to-Interference Ratio) that is defined for the wireless communication system in advance. When the transmission power of D2D communication is fixed, the threshold may be calculated based on, for example, the transmission power of D2D communication and the acceptable SIR. When the transmission power of D2D communication is dynamically controlled for each D2D link, the threshold may be calculated based on, for example, the transmission power of D2D communication that is statically most frequently used in the wireless communication system and the acceptable SIR. Note that data error rate in D2D communication depends on the SIR of the D2D link. Thus, the threshold may be determined based on the worst data error rate acceptable in the wireless communication system.

Upon detecting a possible victim terminal device as described above, the terminal device 2a transmits identification information of the detected terminal device to the base station 1. For example, in the example illustrated in FIG. 3B, it is assumed that possible interference power Pi(a,c) that is to be received by the terminal device 2c from the terminal device 2a and possible interference power Pi(a,d) that is to be received by the terminal device 2d from the terminal device 2a are respectively higher than the threshold θ. In this case, the terminal device 2a transmits identification information "terminal ID: 2c" of the terminal device 2c and identification information "terminal ID: 2d" of the terminal device 2d to the base station 1. The terminal device 2a transmits the identification information of a terminal device to the base station 1 by using PUSCH, for example. Note that, in the following description, the notice of the identification information of a possible victim terminal device from the terminal device 2 to the base station 1 may be referred to as "notice of victim".

The base station 1 receives the notice of victim from the terminal device 2a. By so doing, the base station 1 controls resource allocation for D2D communication based on the notice of victim. Specifically, the resource allocation for D2D communication is controlled in such a way that a resource for an aggressor terminal device (in this case, a source terminal device of the notice of victim) and a resource for a victim terminal device are different from each other. In the example illustrated in FIG. 3B, the base station 1 receives a notice of victim "terminal ID: 2c and 2d" from the terminal device 2a. In this case, the base station 1 controls the resource allocation for D2D communication in such a way that the resource for D2D communication of the terminal device 2a and the resource for D2D communication between the terminal devices 2c and 2d (that is, the resource for the D2D link Lcd) are different from each other.

Note that when the base station 1 receives the notice of victim from the terminal device 2a, the base station 1 may decide whether the resource for an aggressor terminal device is the same as the resource for a victim terminal device. In this case, if the resource for an aggressor terminal device is not the same as the resource for a victim terminal device, the base station 1 does not change the resource allocation for D2D communication.

Figure 4:
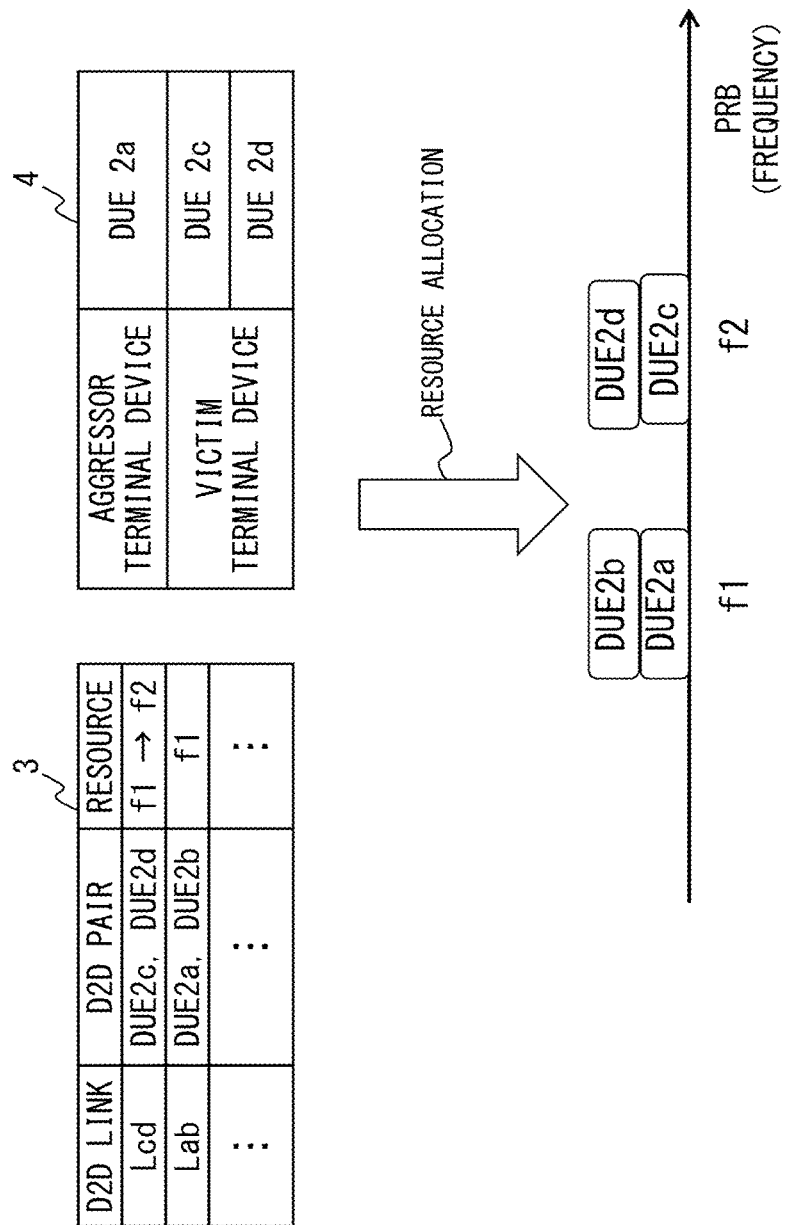
FIG. 4 illustrates resource allocation for D2D communication by a base station.

FIG. 4 illustrates resource allocation for D2D communication by the base station 1. Note that the base station 1 has a D2D link management table 3 and an aggressor/victim list 4 illustrated in FIG. 4.

D2D links established under the base station 1 are registered in the D2D link management table 3. "D2D pair" indicates a source terminal device and a destination terminal device of a D2D link. Resources allocated to respective D2D links are recorded in the D2D link management table 3.

The aggressor/victim list 4 is generated according to the notice of victim received from the terminal device 2. "Aggressor terminal device" indicates a source terminal device 2 of the notice of victim. "Victim terminal device" indicates the terminal device 2 reported by the notice of victim.

The base station 1 controls the resource allocation for D2D communication based on the D2D link management table 3 and the aggressor/victim list 4. For example, the base station 1 specifies a resource allocated to D2D communication of an aggressor terminal device and a resource allocated to D2D communication of a victim terminal device. In the example illustrated in FIG. 4, frequency f1 is allocated to D2D communication of the terminal device (aggressor) 2a. Frequency f1 is also allocated to D2D communication of the terminal devices (victim) 2c and 2d. In this case, the base station 1 controls the resource allocation for D2D communication in such a way that the resource allocated to D2D communication of the aggressor terminal device and the resource allocated to D2D communication of the victim terminal device are different from each other. In the example illustrated in FIG. 4, the frequency for D2D communication between the terminal devices (victim) 2c and 2d is changed from f1 to f2.

Figure 5:
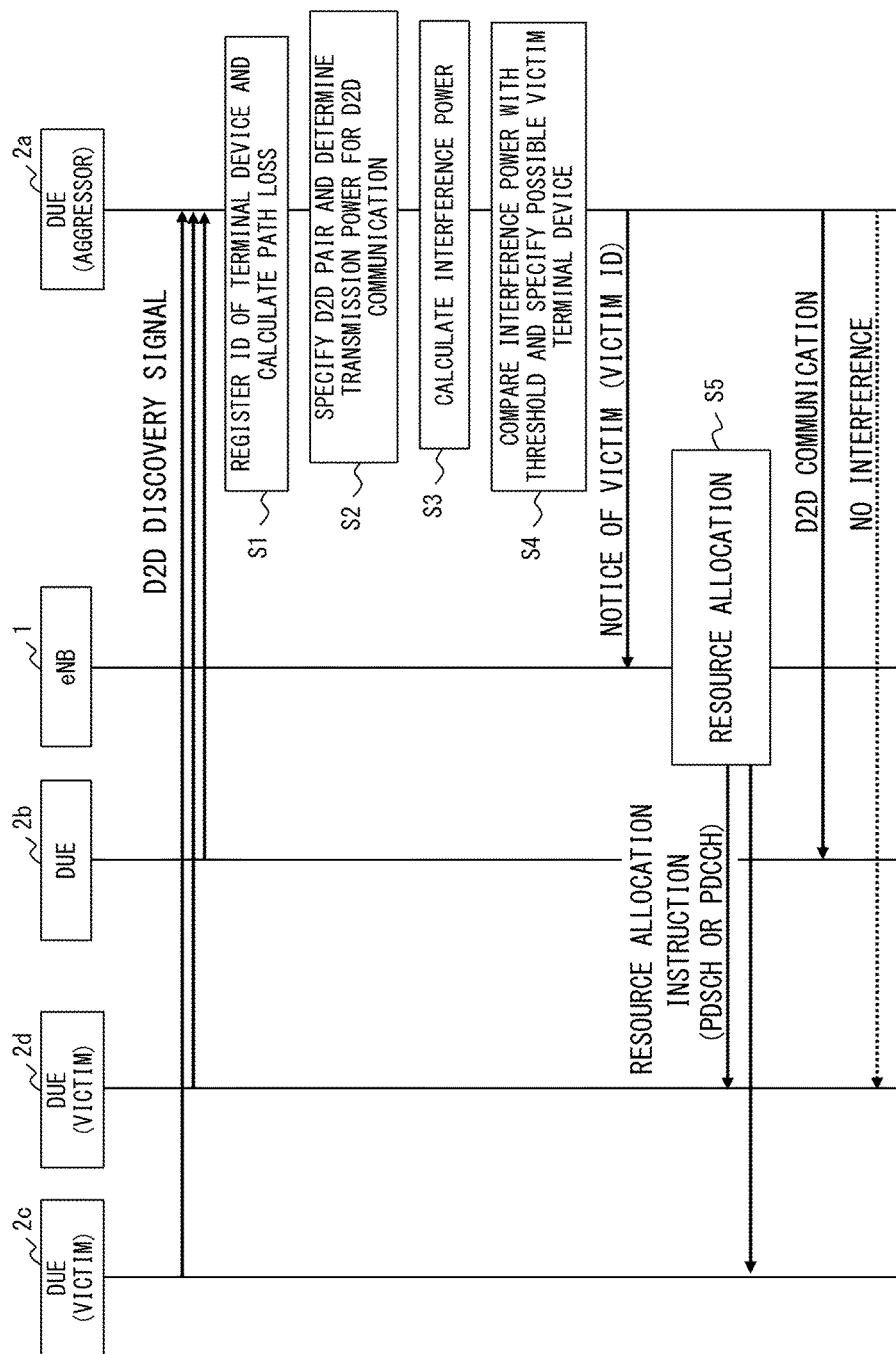
FIG. 5 illustrates a sequence of resource allocation for D2D communication according to the first embodiment.

FIG. 5 illustrates a sequence of resource allocation for D2D communication according to the first embodiment. In the following description, it is assumed that terminal devices 2b, 2c and 2d respectively transmit discovery signals, as illustrated in FIG. 3B.

The terminal device 2a receives the discovery signals respectively from the terminal devices 2b, 2c and 2d. By so doing, in S1, the terminal device 2a records identification information of respective source terminal devices 2 of the discovery signals in a specified memory area. In addition, the terminal device 2a calculates path losses between respective terminal devices 2b, 2c and 2d and local terminal device (that is, the terminal device 2a), based on received powers of respective discovery signals.

In S2, the terminal device 2a specifies a D2D pair. That is, the terminal device 2a specifies a destination terminal device (in this example, the terminal device 2b) of D2D communication. Then the terminal device 2a determines a transmission power to transmit data in D2D communication. The terminal device 2a may use a predetermined initial value as the transmission power to transmit data in D2D communication. In addition, the terminal device 2a may determine the transmission power to transmit data in D2D communication based on received power of a signal (for example, a discovery signal) from the terminal device 2b.

Note that the terminal device 2a may report the D2D pair specified in S2 to the base station 1, although this is not illustrated in FIG. 5. In addition, in a case where the terminal device 2a determines a resource for D2D communication between the terminal devices 2a and 2b, the terminal device 2a may report the determined resource to the base station 1. On the other hand, in a case where the base station 1 determines a resource for D2D communication between the terminal devices 2a and 2b, the base station 1 may report the determined resource to the terminal device 2a (and the terminal device 2b).

In S3, the terminal device 2a calculates an interference power for each of the source terminal devices (in this example, terminal devices 2b, 2c and 2d) of the discovery signal. However, it is not necessary to calculate an interference power for a terminal device (in this example, terminal device 2b) that is specified as one of the D2D pair in S2. Note that the interference power is calculated based on the transmission power of the terminal device 2a and the path loss calculated in S1, as described above.

In S4, the terminal device 2a compares the interference power calculated in S3 and the threshold θ for each of the terminal devices 2c and 2d. According to the comparison result, the terminal device 2a decides whether each of the terminal devices 2c and 2d is a possible victim terminal device. Then the terminal device 2a reports identification information of the possible victim terminal device to the base station 1. In this example, identification information of each of the terminal devices 2c and 2d is reported to the base station 1 as the possible victim terminal devices.

The base station 1 receives a notice of victim from the terminal device 2a. Then in S5, the base station 1 controls resource allocation for D2D communication based on the notice of victim. An example of processing of S5 is described referring to FIG. 4. That is, the base station 1 controls the resource allocation for D2D communication in such a way that a resource for D2D communication between the terminal devices 2a and 2b and a resource for D2D communication between the terminal devices 2c and 2d are different from each other. In this example, the base station 1 changes the resource for D2D communication between the terminal devices 2c and 2d (for example, changes the frequency from f1 to f2), as illustrated in FIG. 4.

In this case, the base station 1 transmits a resource allocation instruction that represents new resource allocation to the terminal devices 2c and 2d. The base station 1 can transmit the resource allocation instruction to the terminal device 2 in a PDSCH (Physical Downlink Shared Channel) or PDCCH. After that, the terminal devices 2c and 2d perform D2D communication using the resource indicated by the resource allocation instruction. That is, the terminal devices 2c and 2d change the D2D communication frequency from f1 to f2.

The terminal device 2*a* starts D2D communication with the terminal device 2*b* using the resource determined in advance. At this time, the resource for D2D communication between the terminal devices 2*a* and 2*b* and the resource for D2D communication between the terminal devices 2*c* and 2*d* are different from each other. Thus, the signal transmitted from the terminal device 2*a* does not have an effect as an interference signal on the D2D communication between the terminal devices 2*c* and 2*d*. In other words, interference between D2D links is suppressed in the wireless communication system that supports D2D communication.

Figure 6:
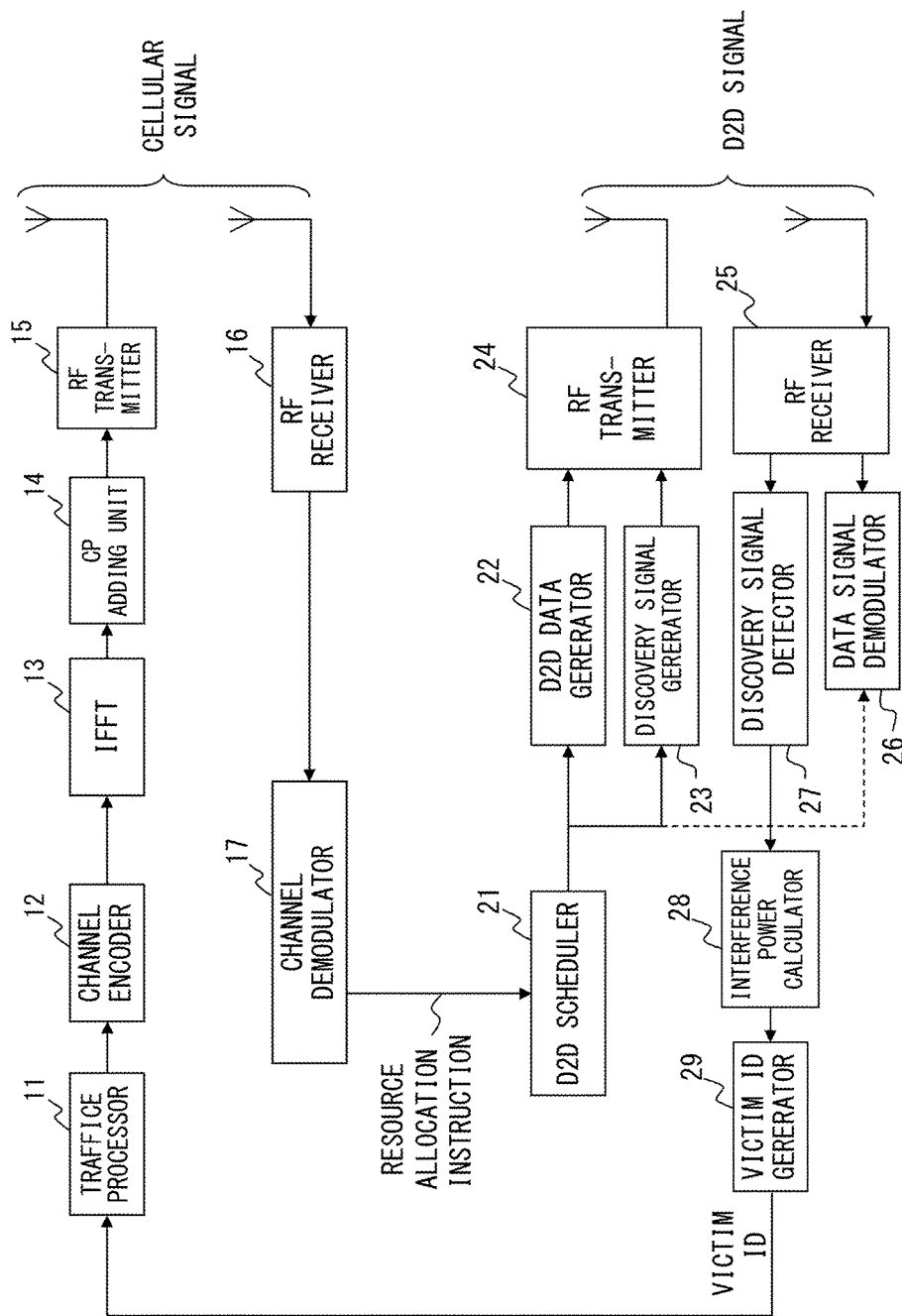
FIG. 6 illustrates an example of a configuration of a terminal device used in the first embodiment.

FIG. 6 illustrates an example of a configuration of the terminal device 2 used in the first embodiment. As describe above, the terminal device 2 supports both cellular communication and D2D communication. Note that the terminal device 2 may include other functions that are not illustrated in FIG. 6.

In order to support cellular communication, the terminal device 2 includes a traffic processor 11, a channel encoder 12, an IFFT circuit 13, a CP adding unit 14, an RF transmitter 15, an RF receiver 16, and a channel demodulator 17.

The traffic processor 11 generates traffic transmitted in cellular communication. Upon receiving a victim ID from a victim ID generator 29 described later, the traffic processor 11 sets the victim ID in the traffic. The channel encoder 12 encodes the traffic output from the traffic processor 11. The IFFT circuit 13 performs IFFT (Inverse Fast Fourier Transform) on an output signal of the channel encoder 12 to generate a time-domain signal. The CP adding unit 14 adds a CP (Cyclic Prefix) to the time-domain signal output from the IFFT circuit 13. The RF transmitter 15 transmits a cellular signal via an antenna.

The RF receiver 16 receives a cellular signal transmitted from the base station 1. The channel demodulator 17 demodulates the received cellular signal. The cellular signal transmitted from the base station 1 to the terminal device 2 is, for example, a PDSCH signal or a PDCCH signal. When the resource allocation instruction is transmitted from the base station 1 using PDSCH, the channel demodulator 17 extracts the resource allocation instruction from PDSCH and guides it to a D2D scheduler 21 described later. In this case, resource allocation is semi-statically performed. When the resource allocation instruction is transmitted from the base station 1 using PDCCH, the channel demodulator 17 extracts the resource allocation instruction from PDCCH and guides it to the D2D scheduler 21. In this case, resource allocation is dynamically performed.

In order to support D2D communication, the terminal device 2 includes the D2D scheduler 21, a D2D data generator 22, a discovery signal generator 23, an RF transmitter 24, an RF receiver 25, a data signal demodulator 26, a discovery signal detector 27, an interference power calculator 28, and the victim ID generator 29.

The D2D scheduler 21 can determine a resource for D2D communication from resources provided by the wireless communication system or resources prepared in advance. For example, when a frequency for D2D communication is determined by the D2D scheduler 21, the terminal device 2 performs D2D communication using the frequency. In addition, the D2D scheduler 21 can control D2D communication of the terminal device 2 according to the resource allocation instruction received from the base station 1. For example, when a frequency for D2D communication is specified by the resource allocation instruction, the D2D scheduler 21 controls the D2D data generator 22 and/or the RF transmitter 24 in such a way that a D2D signal is to be transmitted at the specified frequency. Note that the D2D scheduler 21 may control the RF receiver 25 and/or the data signal demodulator 26 to receive a D2D signal at the specified frequency.

The D2D data generator 22 generates transmission data of D2D communication under the control of the D2D scheduler 21. The discovery signal generator 23 generates the discovery signal. The discovery signal carries identification information of the terminal device itself. In addition, the discovery signal is transmitted, for example, by using PUSCH. The RF transmitter 24 transmits D2D signals (including a D2D data signal and a discovery signal) via an antenna.

The RF receiver 25 receives D2D signals (including a D2D data signal and a discovery signal) transmitted from another terminal device 2. The data signal demodulator 26 demodulates the received D2D signal to recover D2D data.

The discovery signal detector 27 detects a discovery signal in the D2D signal transmitted from another terminal device 2. Then the discovery signal detector 27 obtains identification information of a source terminal device of the discovery signal from a message carried by the detected discovery signal. The interference power calculator 28 calculates a possible interference power received by the source terminal device of the discovery signal based on a received power of the discovery signal. This interference power is calculated based on path loss from the source terminal device of the discovery signal, as described above. The victim ID generator 29 specifies the source terminal device of the discovery signal as a "possible victim terminal device", when the calculated interference power is higher than a threshold. The identification information of a terminal device specified by the victim ID generator 29 is fed to the traffic processor 11 as a "victim ID".

The D2D scheduler 21, interference power calculator 28 and the victim ID generator 29 may be implemented by a processor system that includes a processor and a memory. In this case, the processor provides the function of the D2D scheduler 21, interference power calculator 28 and the victim ID generator 29 described above by executing a given software program.

As described above, when the terminal device 2 detects a possible victim terminal, the terminal device 2 transmits an ID of the detected terminal device to the base station 1. In addition, when the terminal device 2 receives a resource allocation instruction from the base station 1, the terminal device 2 performs D2D communication according to the resource allocation instruction.

FIG. 7 illustrates an example of a configuration of the base station 1 used in the first embodiment. The base station 1 includes an RF receiver 31, a CP removing unit 32, an FFT circuit 33, a channel separator 34, a data signal demodulator 35, a channel decoder 36, a victim ID detector 37, a control signal demodulator 38, a channel decoder 39, a D2D resource scheduler 40, a PUSCH scheduler 41, a control signal generator 42, a data signal generator 43, an IFFT circuit 44, a CP adding unit 45, and an RF transmitter 46, as illustrated in FIG. 7. Note that the base station 1 may include other functions.

The RF receiver 31 receives a cellular signal transmitted from the terminal device 2. The CP removing unit 32 removes a cyclic prefix from the received cellular signal. The FFT circuit 33 performs FFT on the received signal to generate a frequency-domain signal. The channel separator 34 separates the received signal in a frequency domain into a data signal and a control signal.

The data signal demodulator 35 demodulates the received data signal to recover data. The channel decoder 36 decodes the recovered data. The victim ID detector 37 detects a victim ID from the received data. The victim ID is generated by the victim ID generator 29 illustrated in FIG. 6. That is, the victim ID identifies a possible victim terminal device. The control signal demodulator 38 demodulates a received control signal. The channel decoder 39 decodes the demodulated control signal to recover control information.

The D2D resource scheduler 40 includes the D2D link management table 3 and the aggressor/victim list 4 illustrated in FIG. 4, and performs the resource allocation of S5 in FIG. 5. That is, the D2D resource scheduler 40 decides whether a resource for D2D communication of an aggressor and a resource for D2D communication of a victim are the same as each other, based on a victim ID reported from the terminal device 2. When the resource for D2D communication of the aggressor and the resource for D2D communication of the victim are the same as each other, the D2D resource scheduler 40 controls the resource allocation for D2D communication in such a way that the resource for D2D communication of the aggressor and the resource for D2D communication of the victim are different from each other. Then the D2D resource scheduler 40 generates a resource allocation instruction that represents the new resource allocation.

The D2D resource scheduler 40 may be implemented by a processor system that includes a processor and a memory. In this case, the processor provides the function of the D2D resource scheduler 40 described above by executing a given software program. The D2D link management table 3 and the aggressor/victim list 4 are stored in the memory.

The PUSCH scheduler 41 generates control information that controls an uplink by using control information obtained by the channel decoder 39. The control signal generator 42 generates a control signal that carries the control information generated by the PUSCH scheduler 41. The data signal generator 43 generates a data signal to be transmitted to the terminal device 2. The data signal is transmitted to the terminal device 2 using PDSCH. When the resource allocation instruction is generated by the D2D resource scheduler 40, the resource allocation instruction is transmitted to the terminal device 2 using PDSCH or PDCCH. When PDSCH is used, the resource allocation instruction is transmitted by the data signal generator 43. When PDCCH is used, the resource allocation instruction is transmitted by the control signal generator 42.

The IFFT circuit 44 performs IFFT on the control signal and the data signal to generate a time-domain signal. The CP adding unit 45 adds a cyclic prefix to the time-domain signal output from the IFFT circuit 44. The RF transmitter 46 transmits a cellular signal via an antenna.

As described above, in the wireless communication system according to the first embodiment, when a possible victim terminal device of interference between D2D links is detected, the base station 1 controls resource allocation for D2D communication. Accordingly, interference between D2D links is suppressed. It is expected that the interference between D2D links may be suppressed before D2D communication by a possible aggressor terminal device starts.

Second Embodiment

There is a demand for a user to have D2D communication outside a cell of a base station. In addition, D2D communication is a useful communication scheme in an environment where a base station is not available due to a disaster for example. Accordingly, in the second embodiment, resource allocation for D2D communication to suppress interference between D2D links is performed without control of abase station.

Figure 8:
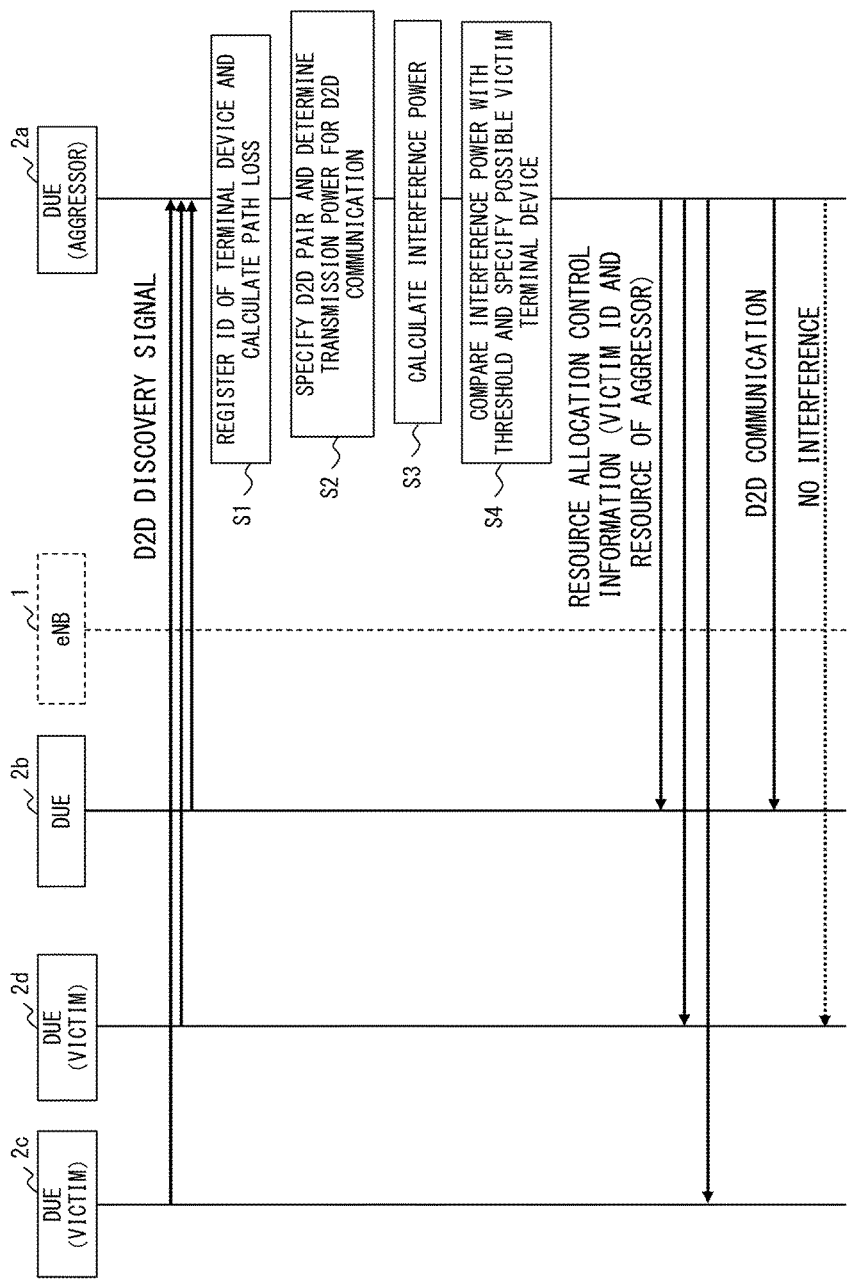
FIG. 8 illustrates a sequence of resource allocation for D2D communication according to a second embodiment.

FIG. 8 illustrates a sequence of resource allocation for D2D communication according to the second embodiment. Note that the base station 1 may exist or may not exist. In any case, resource allocation for D2D communication may be performed without an intervention of the base station 1.

The method for detecting a possible victim terminal device is substantially the same in the first and second embodiments. That is, the terminal device 2a receives discovery signals respectively transmitted from the terminal devices 2b-2d, and calculates possible interference powers received by the terminal devices 2b-2d based on received powers of the respective discovery signals. Then a terminal device that possibly receives an interference power higher than the threshold θ is specified as a possible victim terminal device.

The terminal device 2a broadcasts resource allocation control information. The resource allocation control information includes a victim ID and aggressor resource information. The victim ID identifies a possible victim terminal device specified in S4. The aggressor resource information represents a resource to be used by the terminal device 2 (in this example, the terminal device 2a) that performs S1-S4 in D2D communication.

Upon receiving the resource allocation control information from the terminal device 2a, the terminal device 2 compares the victim ID included in the resource allocation control information with its own ID (or local ID). In the following description, a terminal device identified by a victim ID included in the resource allocation control information may be referred to as a "victim terminal device".

When the received victim ID matches the local ID, the victim terminal device decides whether it is necessary to change the resource for D2D communication, based on the aggressor resource information included in the resource allocation control information. That is, when the resource indicated by the aggressor resource information is the same as the resource used by the terminal device itself, the victim terminal device changes the resource used by the terminal device itself. For example, the victim terminal device may randomly select one radio frequency from a plurality of radio frequencies prepared in advance in the wireless communication system. In this case, the victim terminal device performs D2D communication at a newly selected radio frequency.

In the example illustrated in FIG. 8, it is assumed that terminal devices 2c and 2d perform D2D communication at frequency f1, for example. In addition, the terminal device 2a broadcasts the resource allocation control information "victim ID: 2c and 2d; aggressor resource information: frequency f1". In this case, at the terminal device 2c, the received victim ID matches its own ID (that is, the ID of terminal device 2c), and the frequency indicated by the received aggressor resource information matches the frequency used by the terminal device 2c. That is, the frequency of the aggressor matches the frequency of the victim. The terminal device 2d has the same situation. Thus, the terminal devices 2c and 2d respectively change the frequency for D2D communication. Note that one of the terminal devices 2c and 2d may select a new frequency and report the selected frequency to the other terminal device.

FIG. 9 illustrates an example of a configuration of the terminal device 2 used in the second embodiment. In the second embodiment, a victim ID generated by the victim ID generator 29 is set in the resource allocation control information in a D2D scheduler 51. The resource allocation control information includes information (aggressor resource information) that represents a resource used by the terminal device itself, as described above. The resource allocation control information is broadcast via the RF transmitter 24 in D2D communication.

Resource allocation control information transmitted from another terminal device is extracted by the data signal demodulator 26 and guided to the D2D scheduler 51. Then the D2D scheduler 51 decides whether a resource for D2D communication is to be changed based on the received resource allocation control information. Note that the D2D scheduler 51 may be implemented by a processor system that includes a processor and a memory.

As described above, in the wireless communication system according to the second embodiment, when a possible victim terminal device of interference between D2D links is detected, resource allocation for D2D communication is controlled without intervention of the base station 1. Accordingly, interference between D2D links can be suppressed even in an area where the base station 1 does not exist or the base station 1 is not available.

Third Embodiment

In the first and second embodiments, when a possible victim terminal device of interference between D2D links is detected, resource allocation for D2D communication is controlled. On the other hand, in the third embodiment, when a possible victim terminal device is detected, transmission power of an aggressor terminal device is controlled.

Figure 10:
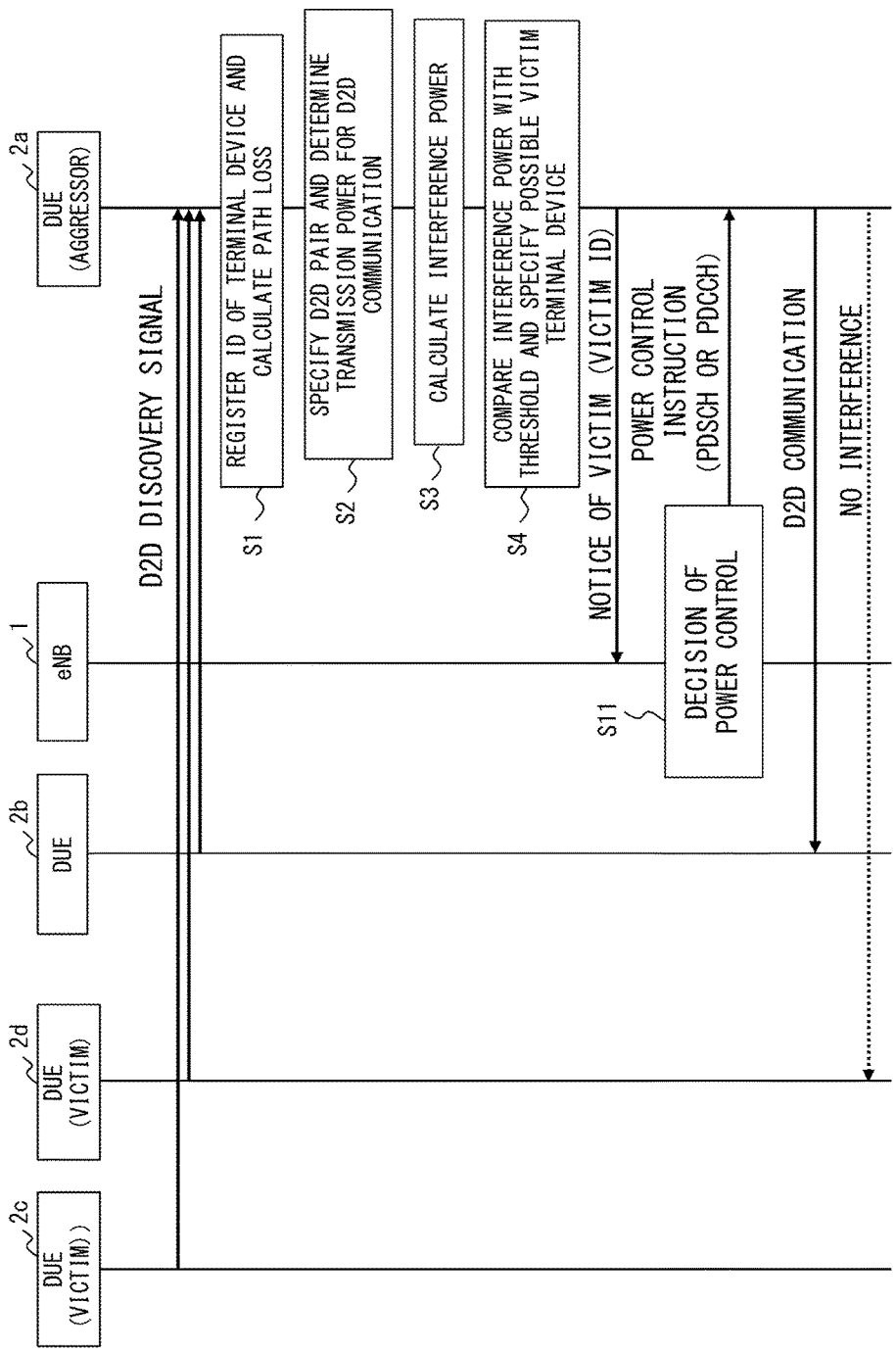
FIG. 10 illustrates a sequence of transmission power control according to a third embodiment.

FIG. 10 illustrates a sequence of transmission power control according to the third embodiment. Note that the method for detecting a possible victim terminal device is substantially the same in the first through third embodiments. That is, the terminal device 2a receives discovery signals respectively transmitted from the terminal devices 2b-2d, and calculates possible interference powers received by the terminal devices 2b-2d based on received powers of the respective discovery signals. Then a terminal device that possibly receives an interference power higher than the threshold θ is specified as a possible victim terminal device.

In this example, the terminal device 2a specifies the terminal devices 2c and 2d as possible victim terminal devices. Then the terminal device 2a transmits a notice of victim that includes identification information of the terminal devices 2c and 2d to the base station 1.

The base station 1 receives the notice of victim from the terminal device 2a. By so doing, in S11, the base station 1 generates a power control instruction that instructs execution of transmission power control. The power control instruction is transmitted to, for example, a source terminal device (in this example, the terminal device 2a) of the notice of victim. That is, the power control instruction is transmitted to an aggressor terminal device.

Upon receiving the power control instruction from the base station 1, the terminal device 2a reduces transmission power for D2D communication. At this time, the terminal device 2a may determine the transmission power in such away that possible interference power received by the terminal devices 2c and 2d is to be lower than a specified threshold. For example, when the interference power is calculated by formula (2), the transmission power Pt is determined in such away that the interference power Pi is lower than the threshold θ. Then the terminal device 2a starts D2D communication with newly calculated transmission power.

Note that when the base station 1 receives the notice of victim from the terminal device 2a, the base station 1 may decide whether the resource for an aggressor terminal device is the same as the resource for a victim terminal device. In this case, if the resource for an aggressor terminal device is not the same as the resource for a victim terminal device, the base station 1 does not have to generate the power control instruction.

When there are a plurality of aggressor terminal devices, the base station 1 may transmit the power control instruction to only one of the plurality of aggressor terminal devices. In the example illustrated in FIG. 2, a transmission signal of the terminal device 2a works as an interference signal on the D2D link between the terminal devices 2c and 2d. At the same time, a transmission signal of the terminal device 2c may work as an interference signal on the D2D link between the terminal devices 2a and 2b. In this case, the base station 1 receives the notice of victim from two aggressor terminal devices (that is, the terminal devices 2a and 2c). In response to the notices, the base station 1 may transmit the power control instruction to only one of the plurality of the terminal devices (the terminal device 2a in FIG. 10). Note that the base station 1 may transmit the power control instruction to all aggressor terminal devices.

The transmission power control according to the third embodiment may be performed in parallel to the resource allocation control. For example, the first and third embodiments may be combined. In this case, the base station 1 may transmit the power control instruction to an aggressor terminal device and transmit the resource allocation instruction to a victim terminal device.

Figure 11:
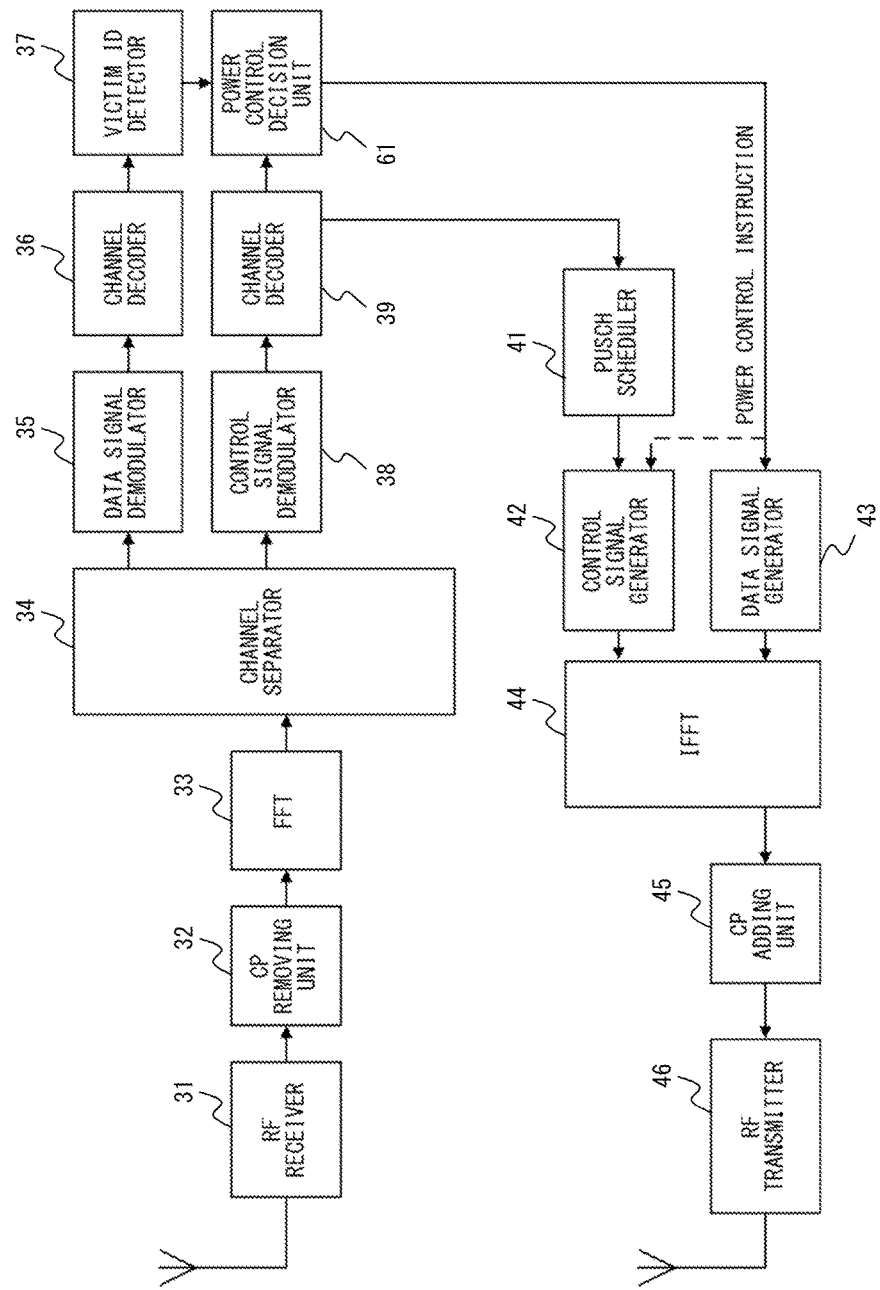
FIG. 11 illustrates an example of a configuration of a base station used in the third embodiment.

FIG. 11 illustrates an example of a configuration of a base station used in the third embodiment. The base station 1 according to the third embodiment includes a power control decision unit 61, as illustrated in FIG. 11.

The power control decision unit 61 decides whether to perform transmission power control based on an victim ID received from an aggressor terminal device. For example, the power control decision unit 61 confirms whether a resource for D2D communication of an aggressor terminal device and a resource for D2D communication of a victim terminal device are the same as each other. When the resource for D2D communication of an aggressor terminal device and the resource for D2D communication of a victim terminal device are the same as each other, the power control decision unit 61 generates the power control instruction. A destination of the power control instruction is the aggressor terminal device.

The power control instruction generated by the power control decision unit 61 is transmitted to the terminal device 2 using PDSCH or PDCCH. When PDSCH is used, the power control instruction is transmitted by the data signal generator 43. When PDCCH is used, the power control instruction is transmitted by the control signal generator 42.

FIG. 12 illustrates an example of a configuration of a terminal device used in the third embodiment. The terminal device 2 according to the third embodiment includes a power controller 62, as illustrated in FIG. 12.

Similarly to the first embodiment, the RF receiver 16 receives a cellular signal transmitted from the base station 1 also in the terminal device 2 according to the third embodiment. The channel demodulator 17 demodulates the received cellular signal. When the power control instruction is transmitted from the base station 1 using PDSCH, the channel demodulator 17 extracts the power control instruction from PDSCH and feeds it to the power controller 62. When the power control instruction is transmitted from the base station 1 using PDCCH, the channel demodulator 17 extracts the power control instruction from PDCCH and feeds it to the power controller 62.

The power controller 62 controls the transmission power for D2D communication according to the power control instruction received from the base station 1. For example, the power controller 62 determines the transmission power in such a way that the interference power calculated by the interference power calculator 28 is lower than the threshold. By so doing, the D2D data generator 22 and the RF transmitter 24 transmit D2D data at the transmission power determined by the power controller 62. The discovery signal generator 23 and the RF transmitter 24 may transmit a discovery signal at the transmission power determined by the power controller 62. Note that the power controller 62 may be implemented by a processor system that includes a processor and a memory.

Variation 1

According to the above described embodiments, the terminal device detects a possible victim terminal device. However, the scope of the invention is not limited to this scheme. For example, upon detecting a discovery signal transmitted from another terminal device, the terminal device 2 may transmit information that identifies a source terminal device of the discovery signal and received power information that represents a received power of the discovery signal to the base station 1. In this case, the base station 1 calculates a possible interference power based on the received power information. Then the base station 1 decides whether the source terminal device of the discovery signal is a possible victim terminal device, based on the calculated interference power. Note that variation 1 may be applied to the first and third embodiments.

Variation 2

A plurality of terminal devices 2 used in the wireless communication system may be grouped into two or more clusters. In this case, D2D communication may be performed within each cluster. Additionally, in the process of detecting a possible victim terminal device, a threshold to be compared with an interference power may be determined respectively for the clusters. Note that variation 2 may be applied to the first, second and third embodiments.

Variation 3

According to the above described embodiments, only one threshold may be compared with an interference power. However, the scope of the invention is not limited to this scheme. That is, resource allocation control may be performed using a plurality of thresholds.

For example, thresholds θ1 and θ2 are prepared for the interference power Pi calculated based on a received power of a discovery signal. It is assumed that θ2 is higher than θ1. When the interference power Pi is lower than or equal to the threshold θ1, identification information (hereinafter, victim ID) of a source terminal device of the discovery signal is not transmitted to the base station 1. When the interference power Pi is higher than the threshold θ1 and lower than or equal to the threshold θ2, the victim ID and interference level information "Low" are transmitted to the base station 1. When the interference power Pi is higher than the threshold θ2, the victim ID and interference level information "High" are transmitted to the base station 1.

Upon receiving the interference level information "High", the base station 1 controls resource allocation for D2D communication similarly to the above described embodiments. On the other hand, upon receiving the interference level information "Low", the base station 1 may control resource allocation for D2D communication only when a specified condition is satisfied. For example, the resource allocation for D2D communication is controlled when an amount of unused resources is larger than a specified threshold. In addition, the resource allocation for D2D communication is controlled when a number of established D2D links is less than a specified threshold. Alternatively, when the base station 1 receives the interference level information "High", the base station 1 may control the resources in such a way that radio frequencies are different from each other and time slots are different from each other between D2D communication of an aggressor and D2D communication of a victim.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication system comprising:
  a plurality of terminal devices respectively configured to support D2D (Device to Device) communication; and
  a base station configured to control the plurality of terminal devices, wherein
  a first terminal device that communicates with a second terminal device via a first D2D link receives a discovery signal including identification information of a third terminal device from the third terminal device that communicates with a fourth terminal device via a second D2D link,
  the first terminal device calculates a possible interference power received by the third terminal device from the first terminal device based on a received power of the discovery signal transmitted from the third terminal device,
  the first terminal device transmits the identification information of the third terminal device and first information that indicates the possible interference power is higher than a first threshold to the base station when the possible interference power is higher than the first threshold,
  the first terminal device transmits the identification information of the third terminal device and second information that indicates the possible interference power is lower than the first threshold and higher than a second threshold, the second threshold being lower than the first threshold, to the base station when the possible interference power is lower than the first threshold and higher than the second threshold,
  the base station controls at least one of a resource for the first D2D link and a resource for the second D2D link in such a way that the resource for the first D2D link and the resource for the second D2D link are different from each other when the based station receives the identification information of the third terminal device and the first information from the first terminal device, and
  the base station controls at least one of a resource for the first D2D link and a resource for the second D2D link in such a way that the resource for the first D2D link and the resource for the second D2D link are different from each other when the based station receives the identification information of the third terminal device and the second information from the first terminal device, and when an amount of unused resources is larger than a specified threshold or a number of established D2D links is less than a specified threshold.

2. The wireless communication system according to claim 1, wherein
the base station changes the resource for the second D2D link when the resource for the first D2D link is the same as the resource for the second D2D link.

3. The wireless communication system according to claim 1, wherein
the base station allocates different frequencies to the first D2D link and the second D2D link.

4. The wireless communication system according to claim 1, wherein
the base station allocates different time slots to the first D2D link and the second D2D link.

5. The wireless communication system according to claim 1, wherein
the first terminal device calculates the possible interference power based on a transmission power with which the first terminal device transmits a data signal to the second terminal device in D2D communication and a path loss that represents a difference between a transmission power of the discovery signal and the received power of the discovery signal.

6. The wireless communication system according to claim 5, wherein
the base station transmits a power control instruction that instructs execution of transmission power control to the first terminal device, and
the first terminal device reduces the transmission power of the first D2D link in such a way that the possible interference power is smaller than the threshold when the first terminal device receives the power control instruction.

7. The wireless communication system according to claim 1, wherein
the plurality of terminal devices are grouped into a plurality of clusters, and
the first threshold and the second threshold are respectively determined for the plurality of clusters.

8. The wireless communication system according to claim 1, wherein
the base station transmits a power control instruction that instructs execution of transmission power control to the first terminal device, and
the first terminal device reduces a transmission power of the first D2D link when the first terminal device receives the power control instruction.

9. A wireless communication system that includes a plurality of terminal devices respectively configured to support D2D (Device to Device) communication, wherein
a first terminal device that communicates with a second terminal device via a first D2D link receives identification information of a third terminal device from the third terminal device that communicates with a fourth terminal device via a second D2D link,
the first terminal device broadcasts the identification information of the third terminal device received from the third terminal device and resource information that represents a resource for the first D2D link directly to the second terminal device, the third terminal device and the fourth terminal device, and
the third terminal device allocates a resource that is different from the resource for the first D2D link represented by the resource information to the second D2D link when the third terminal device directly receives the identification information of the third terminal device and the resource information from the first terminal device.

10. A base station used in a wireless communication system that includes a plurality of terminal devices respectively configured to support D2D (Device to Device) communication, the base station comprising
a processor configured to
manage resources allocated to D2D links in the wireless communication system, and
control resources for the D2D links in the wireless communication system, wherein
when identification information of a third terminal device transmitted from the third terminal device that communicates with a fourth terminal device via a second D2D link is received by a first terminal device that communicates with a second terminal device via a first D2D link, and the base station receives the identification information of the third terminal device and first information that indicates a possible interference power received by the third terminal device from the first terminal device is higher than a first threshold from the first terminal device, the processor controls at least one of a resource for the first D2D link and a resource for the second D2D link in such a way that the resource for the first D2D link and the resource for the second D2D link are different from each other, and
when the identification information of the third terminal device transmitted from the third terminal device is received by the first terminal device, and when the base station receives the identification information of the third terminal device and second information that indicates the possible interference power is lower than the first threshold and higher than a second threshold, the second threshold being lower than the first threshold, from the first terminal device, and when an amount of unused resources is larger than a specified threshold or a number of established D2D links is less than a specified threshold, the processor controls at least one of a resource for the first D2D link and a resource for the second D2D link in such a way that the resource for the first D2D link and the resource for the second D2D link are different from each other.

11. A terminal device used in a wireless communication system that includes a plurality of terminal devices respectively configured to support D2D (Device to Device) communication, the terminal device comprising:
a D2D communication circuit configured to communicate with a corresponding terminal device via a first D2D link;
a detector configured to receive a discovery signal including identification information of a first terminal device transmitted from the first terminal device that communicates with a second terminal device via a second D2D link and detect the identification information of the first terminal device;
a calculator configured to calculate a possible interference power received by the first terminal device from the terminal device based on a received power of the discovery signal transmitted from the first terminal device;
a cellular communication circuit configured to transmit the identification information of the first terminal device detected by the detector to a base station; and
a processor configured to receive resource allocation information generated by the base station and to control a resource of the first D2D link according to the resource allocation information, wherein the cellular communication circuit transmits the identification information of the first terminal device and first information that indicates the possible interference power is higher than a first threshold to the base station when the possible interference power is higher than the first threshold, and the cellular communication circuit transmits the identification information of the first terminal device and second information that indicates the possible interference power is lower than the first threshold and higher than a second threshold, the second threshold being lower than the first threshold, to the base station when the possible interference power is lower than the first threshold and higher than the second threshold.

12. A terminal device used in a wireless communication system that includes a plurality of terminal devices respectively configured to support D2D (Device to Device) communication, the terminal device comprising:

a D2D communication circuit configured to communicate with a corresponding terminal device via a first D2D link;

a receiver configured to receive a discovery signal including identification information of a first terminal device transmitted from the first terminal device that communicates with a second terminal device via a second D2D link;

a processor configured to calculate a possible interference power at the first terminal device from the terminal device based on the received power of the discovery signal that is received by the receiver; and a transmitter configured to broadcast the identification information of the first terminal device included in the discovery signal received by the receiver and resource information that represents a resource for the first D2D link directly to the corresponding terminal device, the first terminal device and the second terminal device when the possible interference power is higher than a specified threshold, wherein the first terminal device allocates a resource that is different from the resource for the first D2D link represented by the resource information to the second D2D link when the first terminal device directly receives the identification information of the first terminal device and the resource information from the terminal device.

13. A wireless communication control method performed by a base station in a wireless communication system that includes a plurality of terminal devices respectively configured to support D2D (Device to Device) communication, the method comprising:

when identification information of a third terminal device transmitted from the third terminal device that communicates with a fourth terminal device via a second D2D link is received by a first terminal device that communicates with a second terminal device via a first D2D link, and the base station receives the identification information of the third terminal device and first information that indicates a possible interference power received by the third terminal device from the first terminal device is higher than a first threshold from the first terminal device, the base station controls at least one of a resource for the first D2D link and a resource for the second D2D link in such a way that the resource for the first D2D link and the resource for the second D2D link are different from each other, and when the identification information of the third terminal device transmitted from the third terminal device is received by the first terminal device, and when the base station receives the identification information of the third terminal device and second information that indicates the possible interference power is lower than the first threshold and higher than a second threshold, the second threshold being lower than the first threshold, from the first terminal device, and when an amount of unused resources is larger than a specified threshold or a number of established D2D links is less than a specified threshold, the base station controls at least one of a resource for the first D2D link and a resource for the second D2D link in such a way that the resource for the first D2D link and the resource for the second D2D link are different from each other.

14. A wireless communication control method performed by a terminal device in a wireless communication system that includes a plurality of terminal devices respectively configured to support D2D (Device to Device) communication, the method comprising:

receiving a discovery signal including identification information of a first terminal device transmitted from the first terminal device that communicates with a second terminal device via a second D2D link before starting communication with a corresponding terminal device via a first D2D link;

calculating a possible interference power received by the first terminal device from the terminal device based on a received power of the discovery signal transmitted from the first terminal device;

transmitting the identification information of the first terminal device and first information that indicates the possible interference power is higher than a first threshold to a base station when the possible interference power is higher than the first threshold;

transmitting the identification information of the first terminal device and second information that indicates the possible interference power is lower than the first threshold and higher than a second threshold, the second threshold being lower than the first threshold, to the base station when the possible interference power is lower than the first threshold and higher than the second threshold;

receiving resource allocation information generated by the base station; and controlling a resource of the first D2D link according to the received resource allocation information.

15. A wireless communication control method performed by a terminal device in a wireless communication system that includes a plurality of terminal devices respectively configured to support D2D (Device to Device) communication, the method comprising:

receiving a discovery signal including identification information of a first terminal device transmitted from the first terminal device that communicates with a second terminal device via a second D2D link before starting communication with a corresponding terminal device via a first D2D link;

calculating a possible interference power at the first terminal device from the terminal device based on the received power of the discovery signal; and broadcasting the identification information of the first terminal device included in the discovery signal and resource information that represents a resource for the first D2D link directly to the corresponding terminal device, the first terminal device and the second terminal device when the possible interference power is higher than a specified threshold, wherein the first terminal device allocates a resource that is different from the resource for the first D2D link represented by the resource information to the second D2D link when the first terminal device directly receives the identification information of the first terminal device and the resource information from the terminal device.

* * * * *